US012559223B2

(12) United States Patent
Mänz et al.

(10) Patent No.: US 12,559,223 B2
(45) Date of Patent: Feb. 24, 2026

(54) FLOOR ARRANGEMENT IN AN AIRCRAFT

(71) Applicant: Airbus Operations GmbH, Hamburg (DE)

(72) Inventors: Christian Mänz, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 155 days.

(21) Appl. No.: 18/462,514

(22) Filed: Sep. 7, 2023

(65) Prior Publication Data

US 2024/0109641 A1    Apr. 4, 2024

(30) Foreign Application Priority Data

Sep. 29, 2022    (EP) .................................... 22198773

(51) Int. Cl.
B64C 1/18        (2006.01)
(52) U.S. Cl.
CPC ...................................... B64C 1/18 (2013.01)
(58) Field of Classification Search
CPC ...................................... B64C 1/18; B64C 1/20
See application file for complete search history.

(56) References Cited

U.S. PATENT DOCUMENTS 2,412,778 A * 12/1946 Kosek ........................ B64C 1/18
                                                          193/41
8,550,401 B2 * 10/2013 Lieven ...................... B64C 1/18
                                                          244/119

11,161,587 B2 * 11/2021 Roth .......................... B64C 1/18
11,203,407 B2 * 12/2021 Sjostrom ................... B64C 1/18
12,263,935 B2 * 4/2025 Schwing ............ B64D 11/0696
2011/0001006 A1 1/2011 Delahaye et al.
2011/0011978 A1 1/2011 Haack et al.
2011/0278396 A1 11/2011 Lieven et al.
(Continued)

FOREIGN PATENT DOCUMENTS

JP        2010137845 A  *  6/2010  ............... B64C 1/18

OTHER PUBLICATIONS

European Search Report for corresponding European Patent Application No. 22198773.8 dated Feb. 24, 2023; priority document.

*Primary Examiner* — Magdalena Topolski
(74) *Attorney, Agent, or Firm* — Greer, Burns & Crain Ltd.

(57)        ABSTRACT

An aircraft cabin floor arrangement includes two floor support part-structures, each having vertical support members, a beam member, cantilevering members and a seat rail. The beam member and the seat rail extend in a first direction with the seat rail being carried by the beam member. The cantilevering members cantilever in a second direction transverse to the first direction. The vertical support members extend in a third direction transverse to the first and second directions. The two floor support part-structures are each configured to be arranged along opposing side portions within an aircraft fuselage structure and are configured to transfer load from the cantilevering members and the beam member to the fuselage structure. The cantilevering members and the beam member are configured to carry a cabin floor configured to provide a load transfer in a plane direction of the floor and to contribute to a stiffening of the fuselage structure.

15 Claims, 4 Drawing Sheets

(56)　　　　　References Cited

U.S. PATENT DOCUMENTS

2016/0200417 A1*　7/2016　Eilken ..................... B64G 1/60
　　　　　　　　　　　　　　　　　244/129.1
2016/0304185 A1　10/2016　Vinches et al.
2023/0192268 A1*　6/2023　Durand ................... B64C 1/18
　　　　　　　　　　　　　　　　　244/119

* cited by examiner

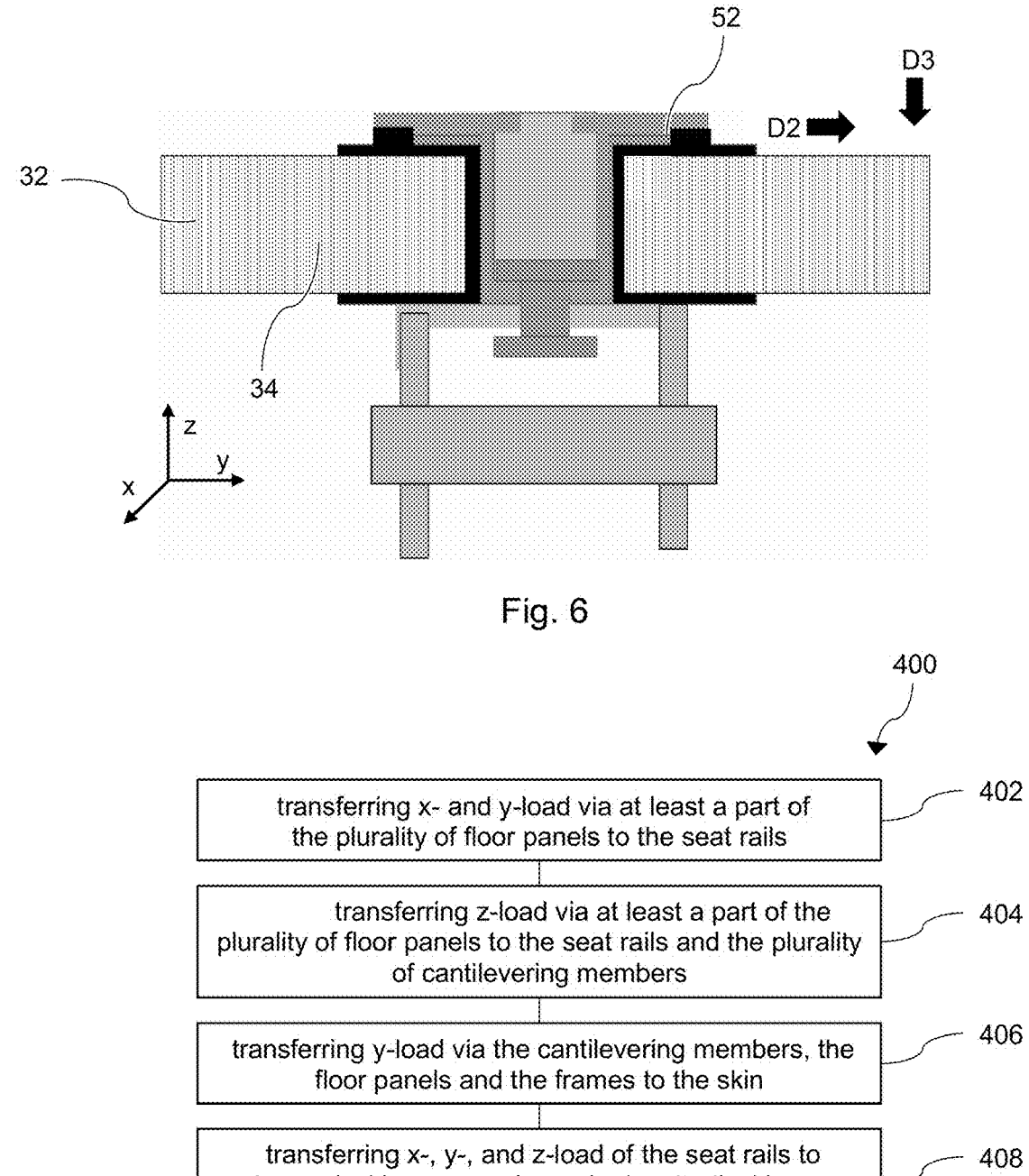

Fig. 6

400 transferring x- and y-load via at least a part of the plurality of floor panels to the seat rails — 402 transferring z-load via at least a part of the plurality of floor panels to the seat rails and the plurality of cantilevering members — 404 transferring y-load via the cantilevering members, the floor panels and the frames to the skin — 406 transferring x-, y-, and z-load of the seat rails to the vertical beam members, the longitudinal beam members and the plurality of cantilevering members — 408 transferring x-load from the longitudinal beam members via floor panels and frames to the skin — 410 transferring z-load from the vertical support members to the fuselage structure — 412

Fig. 7

FLOOR ARRANGEMENT IN AN AIRCRAFT

CROSS-REFERENCES TO RELATED APPLICATIONS

This application claims the benefit of the European patent application No. 22198773.8 filed on Sep. 29, 2022, the entire disclosures of which are incorporated herein by way of reference.

FIELD OF THE INVENTION

The present invention relates to a floor arrangement, to an aircraft cabin system, to an aircraft structure, to an aircraft and to a method for distributing a load in a cabin floor system.

BACKGROUND OF THE INVENTION

Aircraft are provided for different purposes, such as transporting passengers and cargo loads. An aircraft fuselage may be divided into an upper section and a lower section by a separation, such as a floor arrangement provided in a generally horizontal manner. For example, a cabin space for passenger use and a freight deck for cargo use is provided. A general goal is to reduce the aircraft's weight as much as possible. It has been shown that the floor arrangement plays an important role for both aspects, since it directly affects the remaining usable space and since the floor construction may have considerable weight.

SUMMARY OF THE INVENTION

There may thus be a need for an improved cabin floor construction.

The object of the present invention is solved by the subject-matter of the independent claims; further embodiments are incorporated in the dependent claims. It should be noted that the following described aspects of the invention apply also for the floor arrangement, for the aircraft cabin system, for the aircraft structure, for the aircraft and for the method for distributing a load in the cabin floor system.

According to the present invention, a floor arrangement for a cabin of an aircraft is provided. The arrangement comprises two floor support part-structures, each having a plurality of vertical support members, at least one longitudinal beam member, a plurality of cantilevering members and at least one seat rail. The at least one longitudinal beam member extends in a first direction. The at least one first seat rail extends in the first direction and is carried by the at least one first longitudinal beam member. The cantilevering members cantilever in a second direction transverse to the first direction. The vertical support members extend in a third direction transverse to the first and the second direction. The two floor support part-structures are each configured to be arranged along opposing side portions within a fuselage structure of the aircraft. The vertical support members are configured to transfer load from the cantilevering members and the at least one first longitudinal beam member to the fuselage structure of the aircraft. The plurality of cantilevering members and the at least one first longitudinal beam member are configured to carry a cabin floor that is configured to provide a load transfer in a plane direction of the floor and to contribute to a stiffening of the fuselage structure.

Thus, as an example, a floor grid with so-called z-struts in an airplane is provided. As an example, the floor arrangement is provided for single-aisle airplanes. In other examples, the floor arrangement is provided for dual-aisle airplanes or multiple-aisle airplanes. By arranging the cantilevering members, a lighter (regarding weight) construction and space saving (regarding space used by the floor construction itself) arrangement is achieved. This generally addresses the aspect of $CO_2$-reduction, but also customer and cost requirements. Arranging the two floor support part-structures also addresses reducing manufacturing effort and the connected costs. The cantilevering members allow a reduction of the weight. In other words, a reduced weight for the whole design of the floor construction within the fuselage is achieved.

It is noted that the required height for the freight deck below the passenger space, i.e., below the actual cabin, is predetermined, while the height for the cabin is also predetermined. The (constructional) space for providing the floor as separation between cargo department and passenger cabin is thus limited to a given amount. However, the cantilevering concept allows that space within the fuselage is used in an optimized way. In an option, due to the cantilevering members, instead of a beam running in transverse direction in a continuous manner, accessible space is provided, for example available for installation of supplying infrastructure like cables, pipes and air ducts. The cantilevering concept avoids forming unnecessary weight and unnecessarily blocking constructional space.

In an example, the longitudinal beam member and the seat rail are provided as separate members.

In another example, the longitudinal beam member and the seat rail are provided as integrated member, e.g., as a one-piece configuration.

According to an example, the floor arrangement further comprises a plurality of floor panels forming the cabin floor. At least a selected part of the plurality of the floor panels is fixed to the two floor support part-structures. In an option, the selected part of the plurality of floor panels and the two floor support part-structures form a primary structure of the aircraft.

According to an example, the floor arrangement further comprises at least one bridging element. The at least one bridging element connects the two floor support part-structures and the at least one bridging element comprises an inner floor panel and/or a bridging supporting element. In an option, the at least one bridging element is configured such that the two floor support part-structures reinforce each other.

According to an example, at least a first part of the plurality of cantilevering members of the floor arrangement is arranged to project towards the opposing other floor support part-structure and a second part of the plurality of cantilevering members is arranged to project to the outer skin. In an option, the second part of the plurality of cantilevering members is configured to provide a load transfer between the floor arrangement and the fuselage structure.

According to an example, the two floor support part-structures of the floor arrangement each further comprise at least one additional support element and the at least one additional support element is configured to increase the load bearing capability of the arrangement. The at least one additional support element is relocatable in the arrangement. In an option, the at least one additional support element is configured to be part of a secondary structure.

According to the present invention, also an aircraft cabin system is provided. The aircraft cabin system comprises a floor arrangement according to one of the preceding examples. The aircraft cabin system also comprises at least one cabin equipment and at least one additional support element. The at least one additional support element is configured to provide local additional support to carry the cabin equipment when arranged on the cabin floor. The at least one additional support element is configured to be removable and locatable at a plurality of different locations.

According to the present invention, also an aircraft structure is provided. In a first option, the aircraft structure comprises a floor arrangement according to one of the preceding examples. In a second option, the aircraft structure comprises an aircraft cabin system according to one of the preceding examples. In both options, the aircraft structure comprises a fuselage structure of the aircraft comprising a plurality of radially arranged frames and a plurality of longitudinal stringers to carry an outer skin of the aircraft. The floor arrangement is mounted to the fuselage structure.

According to the present invention, also an aircraft is provided that comprises a cabin system according to one of the preceding and following examples and aspects, or an aircraft structure according to the preceding and following examples and aspects.

According to the present invention, also a method for distributing a load in a cabin floor system is provided. The method comprises the followings steps: transferring x- and y-load via at least a part of the plurality of floor panels to the seat rails;

transferring z-load via at least a part of the plurality of floor panels to the seat rails and the plurality of cantilevering members; transferring y-load via the cantilevering members, the floor panels and the frames to the skin; transferring x-, y-, and z-load of the seat rails to the vertical beam members, the longitudinal beam members and the plurality of cantilevering members; transferring x-load from the longitudinal beam members via floor panels and frames to the skin; and transferring z-load from the vertical support members to the fuselage structure.

As an example, a further method for distributing a load in a cabin floor system is provided: In a first step. loads are inserted in at least a part of a plurality of floor panels and/or the seat rails. In a second step, the loads are transferred via the floor panels, the longitudinal beam members and the cantilevering members and the vertical support members to the fuselage structure.

In an example, a floor grid is provided, that is based on the concept of a trusswork. The trusswork comprises multiple features, mostly designed in aluminum. As an advantage, aluminum realizes the given target of minimum weight by straight load path and low material costs. The floor grid comprises a crossbeam built as trusswork or shear web. Advantageously, it enables free y-positioning of seat rails. Seat rails can be kept as flat and small as possible and are made of corrosion resistant steel or titanium. As an advantage, the seat rails resist damage by mishandling during modification of the seat configuration. In addition, as a further advantage, the seat rail support enables load distribution. Z-struts, with tube or H-profile, can be deployed to connect the seat rail support with the frame.

In an option, floor panels are deployed. In another option, floor panels can have a structure of a plastic sandwich. In a further option, floor panels have the capability to transfer shear loads in the z-plane. Advantageously, it leads x-, y- and z-loads of, e.g., passenger and trolleys to the frames of the trusswork.

Within the trusswork, a seal, made from corrosion resistant steel, titanium or plastic, is deployed. As an advantage, it protects all parts made of aluminum.

Further, as an advantage, the whole trusswork structure obtains space provisions for other supplying (sub-) systems.

As an effect, the invention provides an optimal, short and straight, load path from the seat interface to the frames. Advantageously, all parts can be designed in cheap material. Based on these features, the present invention provides a solution that is able to fulfil the future legal, customer and cost requirements. In order to reach the $CO_2$ reduction target, the weight and space of the design is reduced. The present proposal addresses the still existing problems associated with weight and fuel consumption of an aircraft in the field of aviation.

An optimization of the overall weight is attempted by introducing a discontinuity to an initially continuous cross beam of a floor arrangement. Hence, two discontinuous and opposing support members result, bearing a similar stability, though reduced in weight and volume occupied by their construction. Load paths, once subjected to a continuous cross beam, are altered by the discontinuity. The discontinuous load carrying cross-structure, for supporting the floor panels and cabin interior like monuments, also provides an improved load bearing by the z-struts, i.e., the vertical members. The position of the vertical struts within the cargo or freight department is determined by the standardized dimensions of the freight containers used in air freight shipping. The container dimensions lead to a position of the vertical struts, which position is a compromise from a structural mechanic point of view. By providing the discontinuous cross-structure, the load transmission into the vertical struts and, as option, into the fuselage, provides improved static force paths. In an option, the floor panels compensate for this discontinuity while transferring x-, y-, and z-load via seat rails into the supporting structures underneath the floor.

In an option, the present proposal exploits the discontinuity of a trusswork to provide for an enhanced customizability of the supported floor. Parts of the supporting structures can be exchanged and added, distances within the supporting structure can be varied and load paths in the structure can be adjusted without loss of stability of the overall framework or affecting the function of the aircraft.

According to an aspect, an aircraft cabin is provided, wherein the cabin floor is a primary structure and the relocatable cabin equipment a secondary structure. The relocatable cabin equipment is in addition supported by a relocatable cantilevering element adding hard points to the cabin floor. The relocatable cantilevering element is a secondary structure as well. Secondary structure and primary structure are decoupled from each other. In an example, it makes the relocatable cabin equipment, i.e., a relocatable galley element decoupled from the cabin floor. Hence, customer choices of cabin equipment can be made independent and also at a later stage and do not require certification or approval associated with the primary structure.

As an effect, a higher flexibility regarding the equipment of the cabin results.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 6 shows a detailed view of a part of the floor arrangement in a cross section as of FIG. 3.

FIG. 7 shows exemplary steps of an example of a method for distributing a load in a cabin floor system.

DETAILED DESCRIPTION OF THE PREFERRED EMBODIMENTS

Figure 1:
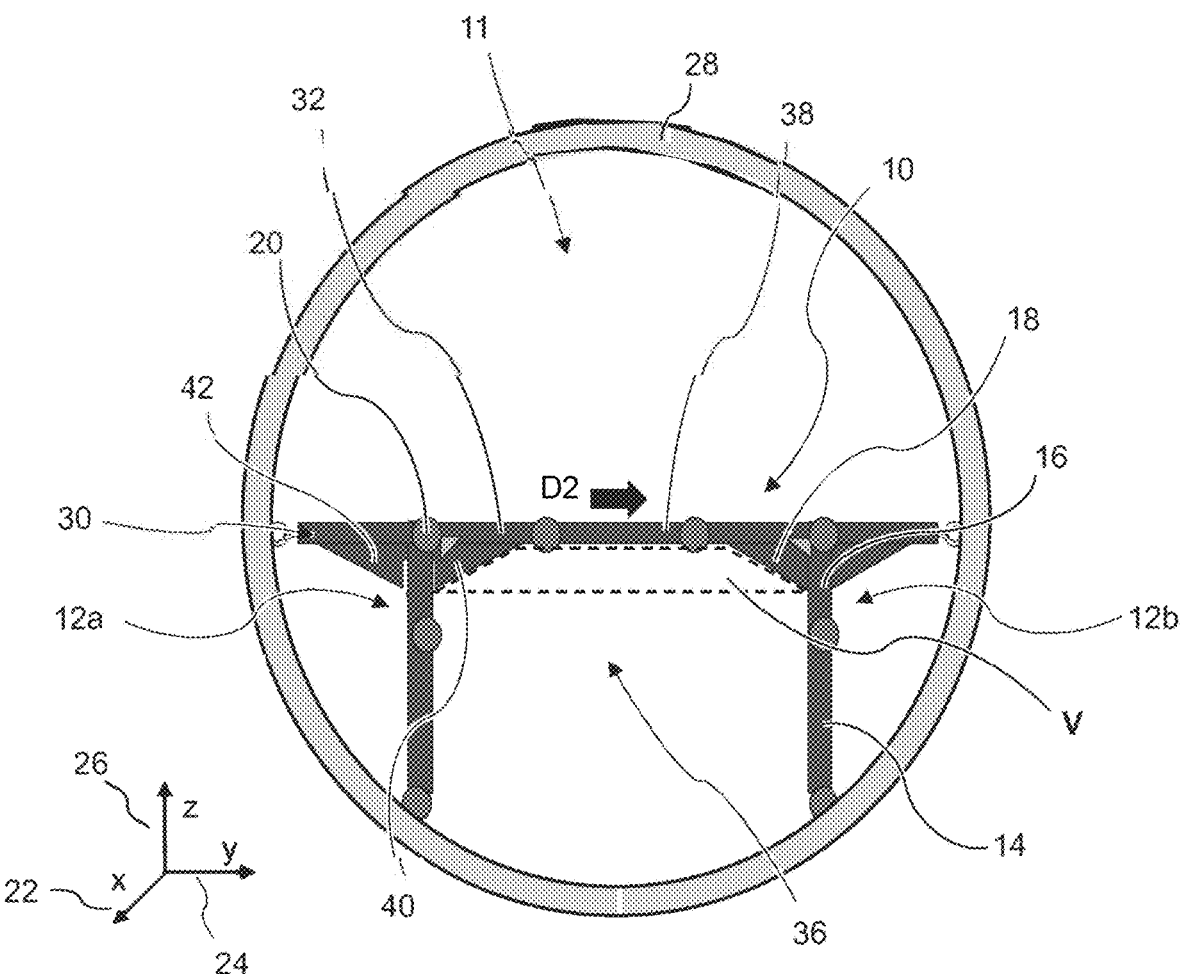
FIG. 1 schematically shows an example of a floor arrangement 10 of an aircraft in a cross section.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows an example of a floor arrangement 10 for a cabin of an aircraft 11 in a cross section. The floor arrangement 10 comprises two floor support part-structures 12a, 12b, each having a plurality of vertical support members 14 and at least one longitudinal beam member 16. The two floor support part-structures 12a, 12b also each have a plurality of cantilevering members 18 and at least one seat rail 20. The at least one longitudinal beam member 16 extends in a first direction D1. The longitudinal beam member 16 is further exemplified in FIG. 2.

Figure 2:
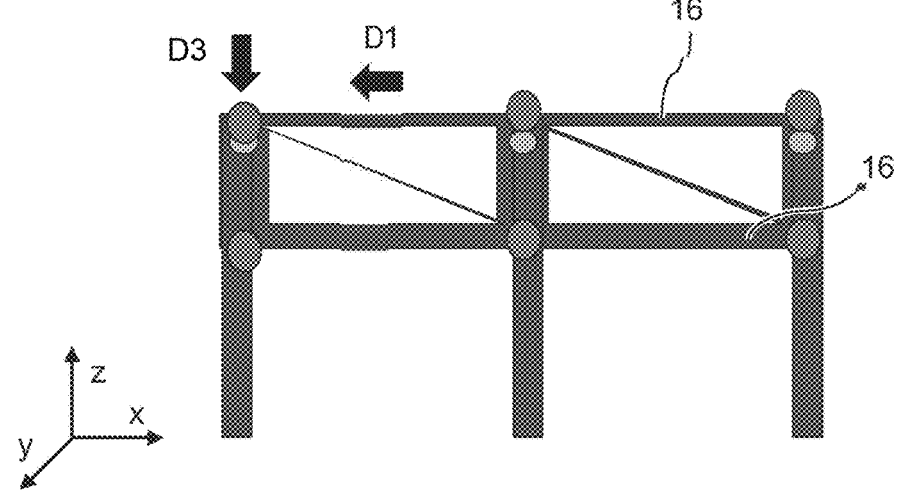
FIG. 2 schematically shows a part of the floor arrangement in a lateral side view transverse to FIG. 1.

FIG. 2 schematically shows a part of the floor arrangement in a lateral side view transverse to FIG. 1. As an option, the longitudinal beam member 16 might be higher than usual, but provided with recesses to save material and weight yet to sustain stability. The at least one first seat rail 20 extends in the first direction D1 and is carried by the at least one first longitudinal beam member 16. The cantilevering members 18 cantilever in a second direction D2 transverse to the first direction D1. The vertical support members 14 extend in a third direction D3 transverse to the first and the second direction D1, D2. The two floor support part-structures 12a, 12b are each configured to be arranged along opposing side portions within a fuselage structure 28 of the aircraft. The vertical support members 14 are configured to transfer load from the cantilevering members 18 and the at least one first longitudinal beam member 16 to the fuselage structure of the aircraft and the plurality of cantilevering members 18 and the at least one first longitudinal beam member 16 are configured to carry a cabin floor 30 that is configured to provide a load transfer in a plane direction of the floor and to contribute to a stiffening of the fuselage structure.

The floor arrangement provides a "floor grid" in a broader sense.

In a first option, the floor support part-structures 12, 12b are provided in a symmetrical manner along a symmetry axis that is aligned with the longitudinal axis of the aircraft, i.e., aligned with a flight direction.

In a second option, the floor support part-structures 12a, 12b are provided in a non-symmetrical manner. For example, one of the floor support part-structures 12a, 12b comprises cantilevering members 18 with a larger degree or amount of cantilevering.

The term "to provide a load transfer in a plane direction" relates to providing a stiffening of the aircraft.

The term "floor support part-structure" relates to an arrangement of supporting members that are provided to hold the floor in place and to take care of conducting the loads from within the cabin to the fuselage structure of the aircraft. The term "part-structure" relates to the fact that two of the structures form the common floor support. The two floor support part-structure run along the port (left, portside) and starboard (right, starboard side) side of the aircraft.

The term "vertical support members" relates to constructional elements or components that extend in a vertical direction when the aircraft is arranged in a horizontal position such as when taxiing or when at the gate. The vertical support members are provided as vertical support columns or pillars. The vertical support members can be arranged as separate components like vertical tube or profiled members or as integrated in a framework structure.

The term "longitudinal beam member" relates to a constructional element or component that extends in a horizontal direction when the aircraft is arranged in a horizontal position such as when taxiing or when at the gate. The (at least one) longitudinal beam member is provided as horizontal support beam or girder. The longitudinal beam member can be arranged as a separate component like vertical profiled members or trusswork segments or as integrated in a framework structure.

The term "cantilevering members" relates to constructional elements or components that are extending from a base like a cantilever, contrary to a spanning beam member.

The term "seat rail" relates to any linear device capable of fixing seats, e.g., in a varying pitch.

The term "to carry" relates to supporting the floor structure.

The term "to provide a load transfer in a plane direction" relates to providing a stiffening of the aircraft.

In terms of cartesian coordinates, the first direction D1 can be referred to as direction along the x-coordinate, or a longitudinal direction of the aircraft. The first direction D1 extends from nose, or cockpit, or front end, to tail, or rear end of the aircraft.

In terms of cartesian coordinates, the second direction D2 can be referred to as direction along the y-coordinate, or a crosswise direction of the aircraft. The second direction D2 extends in the cabin floor plane from the center to the right wing (with an increasing positive value) from the center to the right wing; and from the center (with an increasing negative value from the center to the left wing. In terms of cartesian coordinates, the second direction D2 is perpendicular to the first direction D1, respectively the second direction D2 is transverse to the first direction D1.

In terms of cartesian coordinates, the third direction D3 extends from the ceiling of the cabin down to the cabin floor plane and to the cargo hold of an aircraft when parked on ground. The third direction D3 follows the direction of gravity in an aircraft parked on ground. The third direction D3 can be referred to as direction along the z-coordinate. The third direction D3 is perpendicular to the first and second direction D1, D2, respectively the third direction transverses the first and the second direction D1, D2.

In an example, the vertical support members 14 extending in the third direction D3 can also be referred to as columns, pier, pile, pillar, post, rods, stack, stake, stand, stiffener, struts, sustainer or tubes.

According to an aspect, the floor support part-structures 12a, 12b follow the first direction D1 of the cabin floor in parallel to the middle of the cabin floor. In an example, the main structural part of the cabin floor arrangement is constructed in parallel to the longer direction of the cabin floor. In an example, the floor support part-structures follow the contour of the sidewalls.

In an example, the plurality of cantilevering members 18 opposed between the floor support part-structures 12a, 12b touch each other to form a connection or joint. However, the connection or joint is formed such that the plurality of opposed cantilevering members 18 are forming a non-continuous multiple beam arrangement in the second direction D2. In other words, two opposed and separate cantilevering members 18 substitute one continuous bending beam.

In another example, the plurality of cantilevering members 18 opposed between the floor support part-structures 12a, 12b do not touch each other and a gap is provided such that floor plate members form bridging elements; or bridging inserts are provided to span across the gap.

As an effect, material is saved and weight is reduced, while continuous bending beams are omitted. The constructional concept of having a crossbeam in a second direction is bypassed in whole, or at least in part, by introducing opposed cantilevering members 18.

In an example, the floor support part-structures 12a, 12b are decoupled from the respective other side.

In an example, it is provided that the cantilevering members 18 cantilever from the vertical support members 14 in the second direction D2 transverse to the first direction D1.

In another example, it is provided that the cantilevering members 18 cantilever from the longitudinal beam members 16 in the second direction D2 transverse to the first direction D1.

In another example, it is provided that two cantilevering members 18 are connected such that they cantilever from each other so-to-speak in the second direction D2 transverse to the first direction D1.

As an example, the two connected (or integrated) cantilevering members 18 are supported vertically, but counterbalance each other.

In an example, shown in FIG. 1 as an option, the floor arrangement further comprises a plurality of floor panels 32 forming the cabin floor. At least a selected part 34 of the plurality of the floor panels 32 is fixed to the two floor support part-structures 12a,12b. In an option, the selected part 34 of the plurality of floor panels 32 and the two floor support part-structures 12a, 12b form a primary structure 36 of the aircraft.

The term "primary structure" relates to the parts of the aircraft that are configured to provide stability of the aircraft. The primary structure 36 may also comprise the fuselage with stringers and frames. The primary structure 36 may also comprise the aircraft skin.

In an example, a primary structure is an element in an aircraft that enables necessary functions to operate the aircraft. Primary structures are therefore the most important parts of an aircraft. In an example, the primary structure may also relate to regulations or certification procedures where a classification of the parts is provided for those which are necessary parts. Changing a primary structure of an aircraft hence does not only pose engineering challenges, but it also poses challenges regarding certification or approval of the modification at the primary structure. A secondary structure element in an aircraft does not serve any purpose important for the operation of the aircraft. As a consequence, in an example, they can be modified without special certification or approval.

In an example, the cabin floor construction is taken into account when determining the shearing load for providing stiffening of the structure. As an example, the shearing load is considered to be taken by 0.4 mm of the thickness of the floor panels. It is noted that the major part of the thickness of the panels is necessary for receiving and transferring of the bending load, i.e., the weight forces acting on the panel, for example passengers or trolleys.

In an example, the rigid connection is a non-floating connection of the floor panels and the seat rails or the at least one longitudinal beam member.

In a further example, as shown in FIG. 1, the arrangement comprises at least one bridging element 38. The at least one bridging element 38 connects the two floor support part-structures 12a, 12b. In an option, the at least one bridging element 38 comprises an inner floor panel and/or a bridging supporting element (not shown in detail). In a further option, the at least one bridging element 38 is configured such that the two floor support part-structures 12a, 12b reinforce each other.

In an example, the bridging element 38 can additionally support the inner floor panel.

In a further example, as exemplified by FIG. 1, at least a first part 40 of the plurality of cantilevering members of the floor arrangement, also referred to as inner cantilevering members 40, is arranged to project towards the opposing other floor support part-structure; and a second part 42 of the plurality of cantilevering members of the floor arrangement, also referred to as outer cantilevering members 42, is arranged to project towards the outer skin. In an option of FIG. 1, the outer cantilevering members 42 are configured to provide a load transfer between the floor arrangement and the fuselage structure.

In a further example, not depicted in FIG. 1, the two complementary cantilevering members are provided as a bi-directional cantilevering member. In an option, the vertical bi-directional cantilevering member is vertically supported in a center region; and the bi-directional cantilevering is provided to transfer loads into the fuselage skin on an outer end thus stabilizing an inner end of the bi-directional cantilevering.

In an example, cantilevering members 18 are provided on both sides of one of the vertical support members 14 or on both sides of the at least one longitudinal beam member 16. The outer cantilevering members 42 extend in the opposite direction of the inner cantilevering members 40, which are configured to carry the floor panels 32 as bridging parts, like the bridging element 38, and the second longitudinal beam as well as the second seat rail. In an example, the outer cantilevering members 42 result from mirroring the inner cantilevering members 40 at the vertical support member 14. In an example, the cantilevering members 18 are provided as double-cantilevering members of a single structural member projecting on both sides.

In an example, cantilevering members 18 are attached to both sides of at least one of the vertical support members 14.

Figure 3:
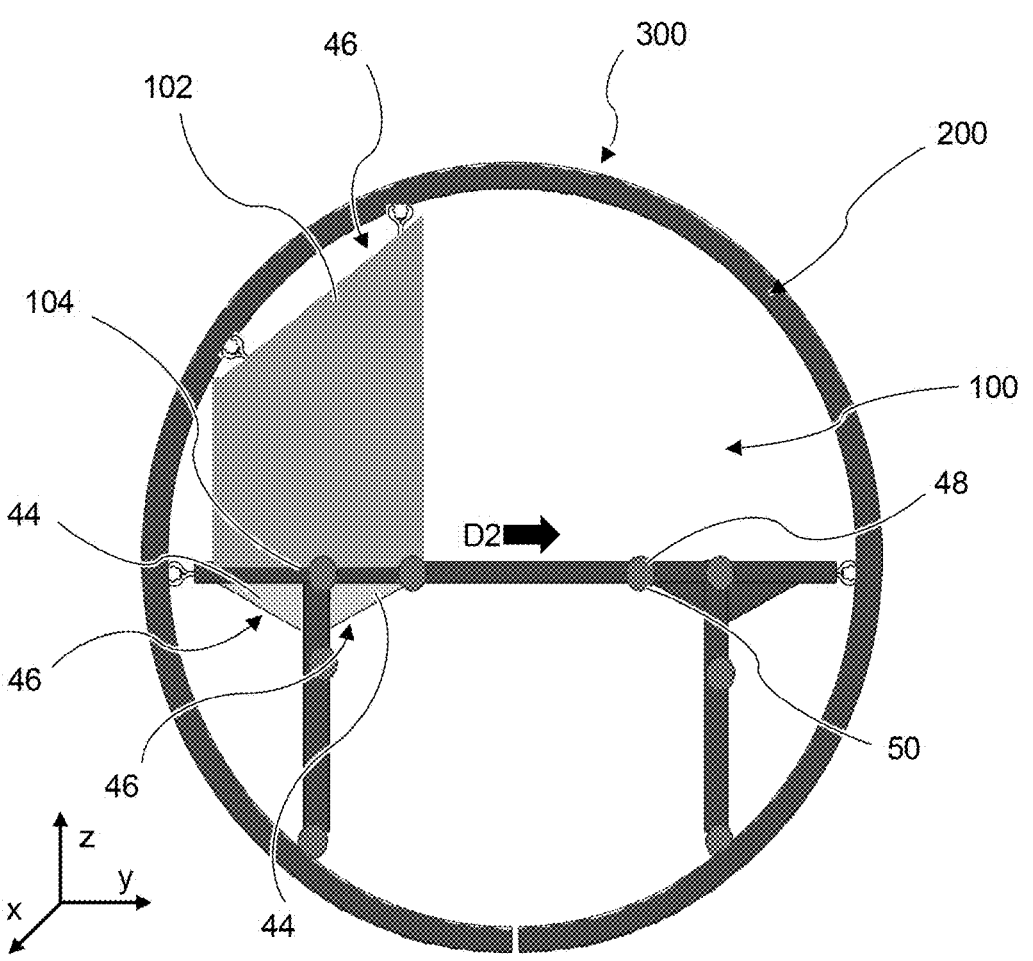
FIG. 3 schematically shows another example of a floor arrangement in a cross section of an aircraft.

FIG. 3 schematically shows another example of a floor arrangement in a cross section of an aircraft.

As an option, an aircraft cabin system 100 is provided. The system 100 comprises an example of the floor arrangement 10 according to one of the preceding examples. The system 100 further comprises at least one cabin equipment 102 and at least one additional support element 104. The at least one additional support element 104 is configured to provide local additional support to carry the cabin equipment when arranged on the cabin floor. The at least one additional support element 104 is configured to be removable and locatable at a plurality of different locations.

In a further example, the additional support element 104 obtains the orientation of the cantilevering members 18, i.e., the inner cantilevering members 40 and/or the outer cantilevering members 42.

The cabin system 100 comprises an example of the floor arrangement with the two floor support part-structures 12a, 12b each further comprising at least one additional support element 44. The at least one additional support element 44 is configured to increase the load bearing capability of the arrangement. In an option, the at least one additional support element 44 is relocatable in the arrangement. In a further option, the at least one additional support element 44 is configured to be part of a secondary structure 46.

In an example, the secondary structure relates to parts which are generally not used for structural load bearing capacities of the structure.

Figure 4:
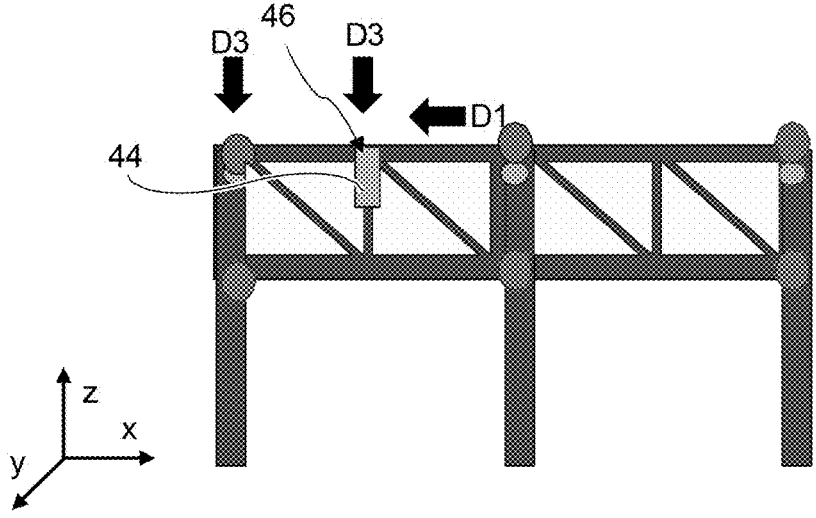
FIG. 4 schematically shows a part of the floor arrangement in a lateral side view transverse to FIG. 3.

FIG. 4 schematically shows a part of the floor arrangement in a lateral side view transverse to FIG. 3, i.e., viewed from the second direction D2. Here, the additional support element 44 as part of the secondary structure 46 is shown from the side.

In an example, the additional support element 44 is provided as a lateral connector.

This supports the technical effect of relocating movable/flexible/secondary structures of the arrangement in the longer direction of the cabin floor. Hence, the cabin floor can be loaded in a more flexible manner and the loading of the cabin floor is independent from the supporting cabin floor arrangement.

In an example, one additional support element is provided. The additional support element is not a part of the primary structure; in other words, the additional support element is decoupled or separated from the primary structure. Hence the additional support element is not necessary for the operation of the aircraft and does not oblige to approval or certification. The additional support element adjusts the load bearing characteristics of the arrangement. It therefore has an influence on the distribution of the cabin loads in the arrangement. While it is decouplable, it can be relocated across the arrangement. It supports or bears the possibility for the arrangement to introduce loads at any point of choice into the fuselage. Hence, the choice of introducing loads is not primarily dependent on the primary structure anymore.

In an example, the additional support element can be a cantilevering member.

In an example, the additional support element is translatable along the floor support part-structure in the first direction. In other words, the additional support element can obtain variable positions in the arrangement along the aircraft. The flexible connector arm can serve as additional support for the floor panels. Hence it provides additional so-called hard points at the cabin floor. These hard points can be used as additional support for cabin floor loads.

In an option, the additional support element does not only support the floor panels directly but also the other members of the arrangement. In an option, the additional support element supports at least one of the group of the seat rail, the longitudinal beam, the bridging element, the vertical beam members, the longitudinal beam members, the cantilevering members and additional monuments like galleys of lavatories.

In an example, as depicted in FIG. 3, at least one of the two floor support part-structures further comprises a second seat rail 48 and a second longitudinal beam 50. The second longitudinal beam is connected to the vertical support members by a part of the cantilevering members.

In an example, the at least one second seat rail and the at least one second longitudinal beam member extend in the first direction. For example, the second seat rail runs parallel to the first seat rail.

In an example, the plurality of cantilevering members attach the two floor support part-structures to the fuselage structure.

In an example, the first arm of the cantilevering members allows a flexible y-position for the seat rail. In that manner, the distance between the seat rails can be varied by the length of the first arm. In an example, the first arm supports tie down points to secure cargo nets in the cargo hold of the aircraft.

In an example, three or more seat rails are provided on both sides.

In an example, the second seat rail is arranged within the cabin wall structure, e.g., in a plane above the first seat rail.

In an example, a constructional space available for installation or other purposes is provided between the opposing cantilevering members of the two floor support part-structures.

In an example, the cantilevering members are provided as brackets or triangular modules. Due to their geometry, the brackets and triangular modules provide areas in the framework, which follow the cabin floor in a first direction and can therefore extend to provide additional volume V of space and support for ducts, conduits and cables tracks. In other words, the infrastructure becomes an integral part of the cabin floor and does not block additional space, e.g., below in the aircraft.

In an example, the two floor support part-structures of the arrangement further comprise a reinforced longitudinal beam. The reinforcement is configured to act on the connection between the at least one longitudinal beam member and the plurality of vertical support members; and the reinforcement is configured to increase strength for x-load in the arrangement.

In an example, the longitudinal beams are reinforced at the beam members in a first direction with additional brackets, connector arms or struts.

In an example, the two floor support part-structures of the arrangement further comprise hole to hole connections and rotary joints at the interfaces of the vertical support members, the cantilevering members and the seat rails.

In a further option, not shown in FIG. 3, at least one of the two floor support part-structures further comprises at least one tensile load transferring element within the floor plane.

In an option, the at least one tensile load transferring element connects the first seat rail and the second seat rail.

In another option, the at least one metal strap is configured to reinforce a lateral connection between the at least one first seat rail, the at least one second rail and at least one of the cantilevering members.

In an example, the tensile load transferring element is made from titanium or stainless steel. In an example, to provide connection between the metal strap and the first and second rail, the tensile load transferring element can be clamped under the rails and fixed with a bolt. The term "lateral connection" means a connection in the second direction, the y-direction respectively. As an effect, the use of thin titanium metal provides low weight at high stability.

FIG. 3 further depicts an aircraft cabin system 100. The system comprises a floor arrangement according to one of the preceding examples and options, at least one cabin equipment 102 and at least one additional support element. The at least one additional support element is configured to provide local additional support 104 to carry the cabin equipment when arranged on the cabin floor. In an option, the at least one additional support element is configured to be removable and locatable at a plurality of different locations.

FIG. 3 further depicts, as an option, a cross section of an aircraft structure 200. The aircraft structure 200 comprises a fuselage structure of the aircraft comprising a plurality of radially arranged frames and a plurality of longitudinal stringers to carry an outer skin of the aircraft and either a floor arrangement according to one of the preceding examples and options, or an aircraft cabin system according to the preceding example and the floor arrangement is mounted to the fuselage structure.

Shown as an option, an aircraft 300 is provided that comprises a cabin system according to one of the preceding examples, or an aircraft structure according to one of the preceding examples. The aircraft 300 comprises a cabin system according to one of the preceding examples or the aircraft structure according to the preceding examples.

In an example, a modular system is provided that allows building a floor grid for an aircraft. The modular system comprises several modules and components like bricks for construction of building structures.

In an example, at least two longitudinal members like beams are provided as load distribution device for vertical loads.

In an example, lateral connectors are provided between the lateral beams and the lateral primary structure interface 36.

In an example, rotary interface connectors are provided on all interfaces.

In an option, a primary structure part in form of the "floor grid" is provided, comprising connecting frames, like the longitudinal beams member 16 and the cantilevering members 18, the vertical support members 14, the selected part 34 of the floor panels 32 and the seat rails 20, to create a load transfer of cabin loads into the fuselage, as a further part of the primary structure 36, and reinforcing the fuselage with the stiffness of the primary structure part.

In an example, primary structure interfaces allow a tolerance compensation of global tolerances.

In an example, the floor grid allows the introduction of local bridges for the introduction of additional cabin interfaces (decoupling).

In an example, the floor grid allows the attachment of stainless rail adaptors for clamped floor and ceiling panels.

In a further example, an interlocking connection of the at least one lateral connecting rail to at least a part of the plurality of floor panels provides a sealing of the two floor support part-structures from the cabin environment.

In a further example, a continuous crossbeam along the second direction is substituted by discontinuous support members carried by vertical support members.

Figure 5:
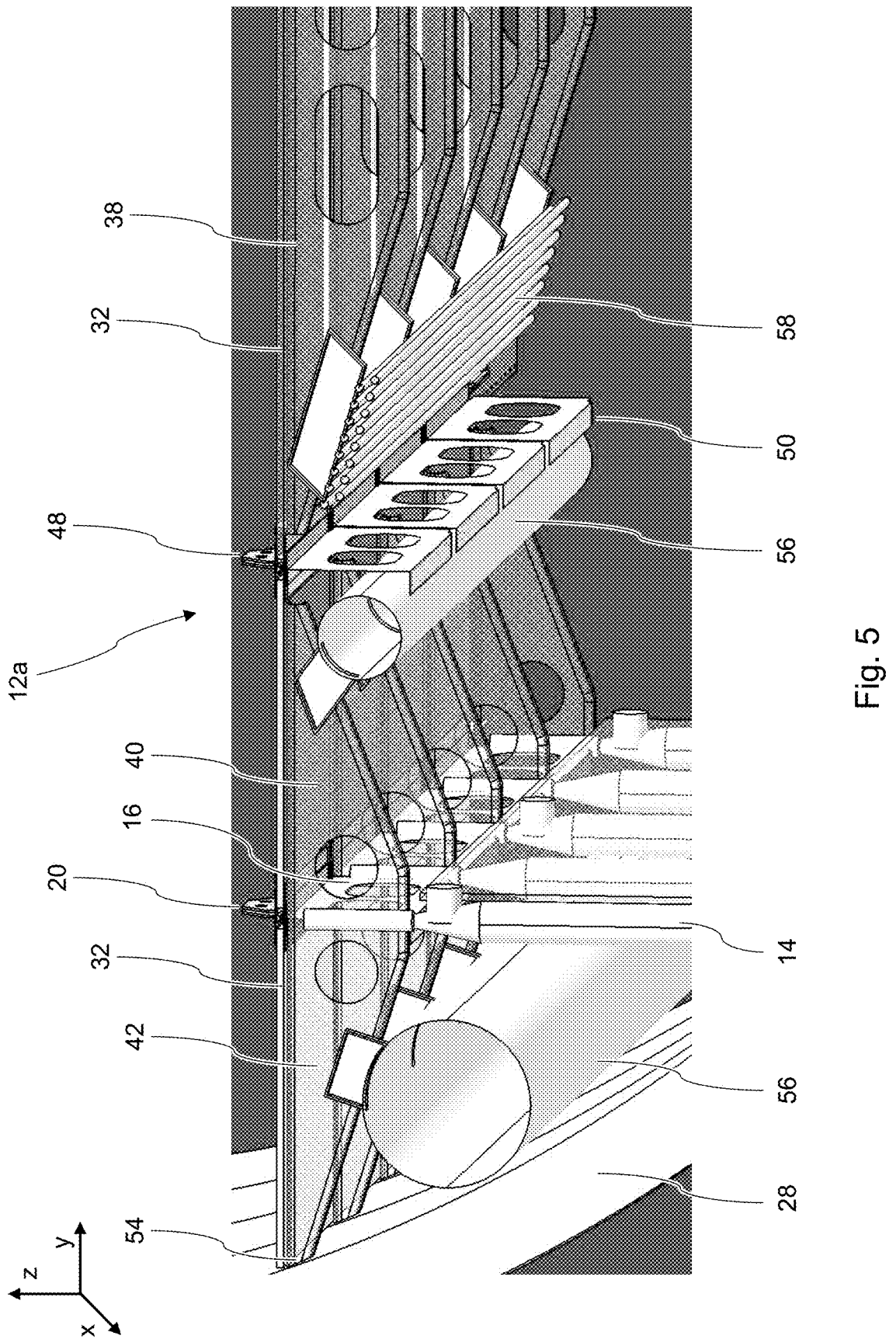
FIG. 5 shows a perspective view from below on the floor support part-structure of the floor arrangement in a cross section.

FIG. 5 shows a perspective view from below on one of the floor support part-structure 12a of the floor arrangement in a cross section. In the drawing, when viewed in landscape mode, the other one of the floor support part-structure 12a is provided to the right at the not-shown right end of the bridging element 38. In an example, the floor support part-structure 12a comprises the first seat rail 20 and the second seat rail 48. The first seat rail 20 and the second seat rail 48 interlock the floor panels 32. The first seat rail 20 is carried by the first longitudinal beam member 16 that is supported by vertical support members 14. The second seat rail 48 is carried by the second longitudinal beam 50. The second longitudinal beam 50 is suspended, e.g., from the outer points of the inner cantilevering members 40. In an example, the second longitudinal beam 50 is formed by several second longitudinal beam members or segments. The second longitudinal beam members are each suspended from the respective inner cantilevering members 40. The inner cantilevering members 40 are connected to the bridging element 38 and are attached to the vertical support members 14. The outer cantilevering members 42 are attached to the vertical support members 14 and connected via a connection 54 to the fuselage structure 28. Inner cantilevering members 40 and outer cantilevering members 42 form bi-directionally cantilevering members that are supported vertically in a center region by the vertical support members 14. The inner cantilevering members 40, the outer cantilevering members 42, and the bridging elements 38 provide accessible additional volume of space and support, for example for air ducts 56 and cables 58 running in the first direction D1, i.e., along the longitudinal direction of the aircraft. The inner cantilevering members 40, the outer cantilevering members 42 and also the bridging elements 38 are forming so-to-speak recesses of the floor support construction.

FIG. 6 schematically shows an example of a cross section of the lateral connection of the floor panels to the seat rails viewed from the first direction. In an example, as exemplified by FIG. 5, the at least one first seat rail comprises at least one lateral connecting rail 52 configured to interlock at least a part of the plurality of floor panels in the primary structure.

The interlocking rail and the at least a part of the plurality of floor panels is configured to reinforce the arrangement.

In an example, the rails provide a profile that can be used to plug-in or insert the floor panels sideways such that they become an integral structural part of the framework yielding a primary structure element. In other words, the panels are clamped into the rails sideways. The plug-in mechanism further provides a direct and short load path of x-loads and y-loads of the floor panels in the rails and consequently in the rail support structure and the whole framework.

FIG. 7 shows steps of a method 400 for distributing a load in a cabin floor system. The method comprises the following steps. In a first step 402, x- and y-loads are transferred via at least a part of the plurality of floor panels to the seat rails. In a second step 404, z-load is transferred via at least a part of the plurality of floor panels to the seat rails and the plurality of cantilevering members. In a third step 406, y-load is transferred via the cantilevering members, the floor panels and the frames to the skin. In a fourth step 408, x-, y-, and z-loads of the seat rails are transferred to the vertical beam members, the longitudinal beam members and the plurality of cantilevering members. In a fifth step 410, x-load is transferred from the longitudinal beam members via floor panels and frames to the skin. In a sixth step 412, z-load is transferred from the vertical support members to the fuselage structure.

In a further example, a method is provided, in which in a first step, loads are inserted in at least a part of a plurality of floor panels and/or the seat rails. In a second step, the loads are transferred via the floor panels, the longitudinal beam members and the cantilevering members and the vertical support members to the fuselage structure.

In an example, the connection of the floor panels and the seat rails provides a sealing from the so-called wet area of the cabin to the dry areas of the floor which need to remain dry due to corrosion of, i.e., the metal framework of the arrangement comprising aluminum. It also applies to any liquid spilled on the cabin floor. In an example, the liquid or gaseous substances can comprise, e.g., water, detergents, salt-containing liquids, cola, water vapor and others.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

A single processor or other unit may fulfil the functions of several items re-cited in the claims. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floor arrangement for a cabin of an aircraft, the arrangement comprising:
two floor support part-structures, each having:
a plurality of vertical support members;
at least one longitudinal beam member;
a plurality of cantilevering members;
at least one seat rail; and
at least one bridging element;
wherein the at least one longitudinal beam member extends in a first direction;
wherein the at least one first seat rail extends in the first direction and is carried by the at least one first longitudinal beam member;
wherein the cantilevering members of one floor support part-structure extends from a vertical support member of the plurality of vertical support members in a second direction transverse to the first direction towards another one of the cantilevering members of one floor support part-structure;
wherein the vertical support members extend in a third direction transverse to the first and the second direction;
wherein the two floor support part-structures are each configured to be arranged along opposing side portions within a fuselage structure of the aircraft;
wherein the vertical support members are configured to transfer load from the cantilevering members and the at least one first longitudinal beam member to the fuselage structure of the aircraft;
wherein the plurality of cantilevering members and the at least one first longitudinal beam member are configured to carry a cabin floor that is configured to provide a load transfer in a plane direction of the floor and to contribute to a stiffening of the fuselage structure;
wherein the at least one bridging element connects the two floor support part-structures;
wherein the at least one bridging element comprises at least one of an inner floor panel or a bridging supporting element; and
wherein the at least one bridging element is configured such that the two floor support part-structures reinforce each other.

2. The floor arrangement according to claim 1, further comprising:
a plurality of floor panels forming the cabin floor;
wherein at least a selected part of the plurality of the floor panels is fixed to the two floor support part-structures; and
wherein the selected part of the plurality of floor panels and the two floor support part-structures form a primary structure of the aircraft.

3. The floor arrangement according to claim 1,
wherein at least a first part of the plurality of cantilevering members is arranged to project towards the opposing other floor support part-structure; and a second part of the plurality of cantilevering members is arranged to project to the outer skin; and
wherein the second part of the plurality of cantilevering members is configured to provide a load transfer between the floor arrangement and the fuselage structure.

4. The floor arrangement according to claim 1, wherein two complementary cantilevering members are provided as a bi-directional cantilevering member;
wherein the vertical bi-directional cantilevering member is vertically supported in a center region; and
wherein the bi-directional cantilevering is provided to transfer loads into the fuselage skin on an outer end thus stabilizing an inner end of the bi-directional cantilevering.

5. The floor arrangement according to claim 1, wherein the two floor support part-structures each further comprise:
at least one additional support element;
wherein the at least one additional support element is configured to increase a load bearing capability of the arrangement;
wherein the at least one additional support element is at least one of relocatable in the arrangement or removable; and
wherein, the at least one additional support element is configured to be part of a secondary structure.

6. The floor arrangement according to claim 1, wherein at least one of the two floor support part-structures further comprises:
a second seat rail; and
a second longitudinal beam;
wherein the second longitudinal beam is connected to the vertical support members by a part of the cantilevering members.

7. The floor arrangement according to claim 1, wherein the at least one first seat rail comprises at least one lateral connecting rail configured to interlock at least a part of the plurality of floor panels in the primary structure.

8. The floor arrangement according to claim 7, wherein an interlocking connection of the at least one lateral connecting rail to at least a part of the plurality of floor panels provides a sealing of the two floor support part-structures from the cabin environment.

9. An aircraft cabin system, the system comprising:

a floor arrangement according to claim 1;

at least one cabin equipment; and at least one additional support element;

wherein the at least one additional support element is configured to provide local additional support to carry the cabin equipment when arranged on the cabin floor; and wherein the at least one additional support element is configured to be removable and locatable at a plurality of different locations.

10. An aircraft structure comprising:

a floor arrangement according to claim 1; and a fuselage structure of the aircraft comprising a plurality of radially arranged frames and a plurality of longitudinal stringers to carry an outer skin of the aircraft;

wherein the floor arrangement is mounted to the fuselage structure.

11. An aircraft structure comprising:

an aircraft cabin system according to claim 9; and a fuselage structure of the aircraft comprising a plurality of radially arranged frames and a plurality of longitudinal stringers to carry an outer skin of the aircraft;

wherein the floor arrangement is mounted to the fuselage structure.

12. An aircraft comprising a cabin system according to claim 9.

13. An aircraft comprising an aircraft structure according to claim 10.

14. A method for distributing a load in a cabin floor system according to claim 1, transferring an x-and a y-load via at least a part of the plurality of floor panels to the seat rails;

transferring a z-load via at least a part of the plurality of floor panels to the seat rails and the plurality of cantilevering members;

transferring the y-load via the cantilevering members, the floor panels and the frames to the skin;

transferring the x-, y-, and z-loads of the seat rails to the vertical beam members, the longitudinal beam members and the plurality of cantilevering members;

transferring the x-load from the longitudinal beam members via floor panels and frames to the skin; and transferring the z-load from the vertical support members to the fuselage structure.

15. A floor arrangement for a cabin of an aircraft, the arrangement comprising two floor support part-structures, each having:

a plurality of vertical support members;

at least one longitudinal beam member;

a plurality of cantilevering members;

at least one seat rail; and at least one bridging element;

wherein the at least one longitudinal beam member extends in a first direction;

wherein the at least one first seat rail extends in the first direction and is carried by the at least one first longitudinal beam member;

wherein the cantilevering members of one floor support part-structure extends from a vertical support member of the plurality of vertical support members in a second direction transverse to the first direction towards another one of the cantilevering members of one floor support part-structure;

wherein the vertical support members extend in a third direction transverse to the first and the second direction;

wherein the two floor support part-structures are each configured to be arranged along opposing side portions within a fuselage structure of the aircraft;

wherein the vertical support members are configured to transfer load from the cantilevering members and the at least one first longitudinal beam member to the fuselage structure of the aircraft;

wherein the plurality of cantilevering members and the at least one first longitudinal beam member are configured to carry a cabin floor that is configured to provide a load transfer in a plane direction of the floor and to contribute to a stiffening of the fuselage structure, and wherein at least a first part of the plurality of cantilevering members is arranged to project towards the opposing other floor support part-structure and a second part of the plurality of cantilevering members is arranged to project to the outer skin;

wherein the second part of the plurality of cantilevering members is configured to provide a load transfer between the floor arrangement and the fuselage structure; and wherein the at least one bridging element connects the two floor support part-structures.

* * * * *